Feb. 11, 1947.     H. R. FORNEY     2,415,479
DRAFT HITCH
Filed June 8, 1945
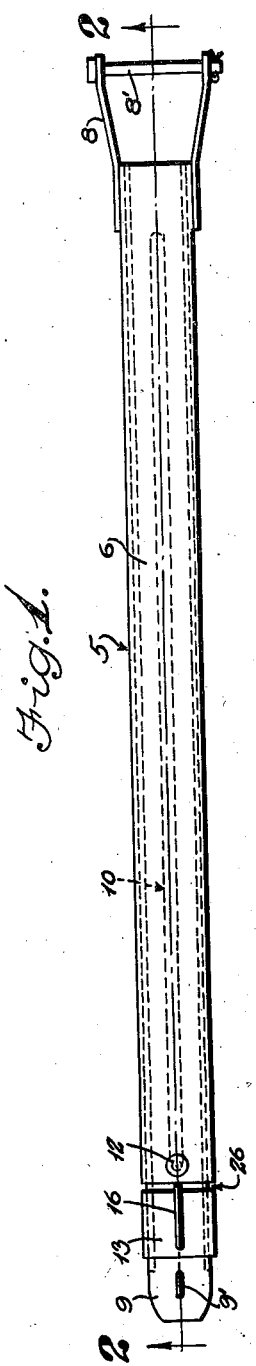
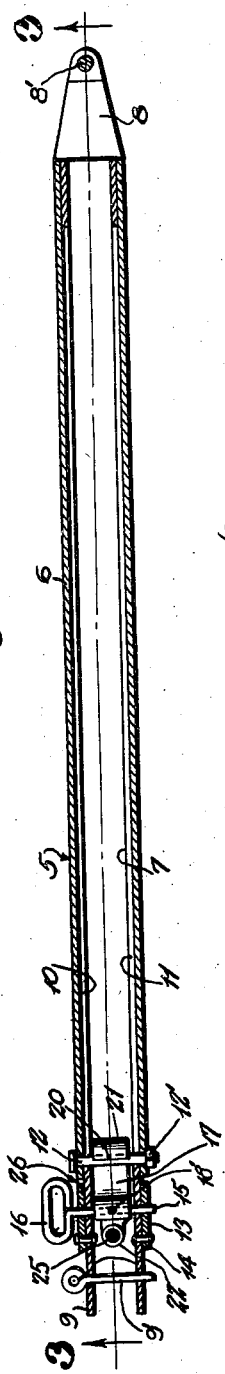
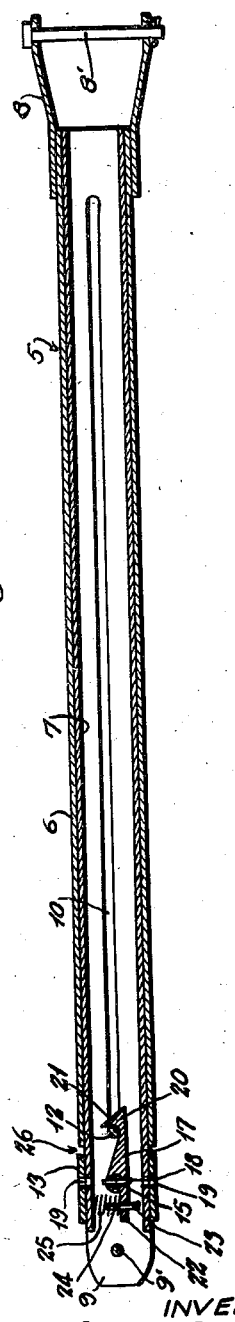
INVENTOR
Harold R. Forney
ATTORNEYS Patented Feb. 11, 1947

2,415,479

UNITED STATES PATENT OFFICE 2,415,479

DRAFT HITCH

Harold R. Forney, Surprise, Nebr.

Application June 8, 1945, Serial No. 598,228

3 Claims. (Cl. 280—33.14)

This invention relates to draft hitches and more particularly to a device for connecting a trailer to a tractor.

An object of the invention is to improve generally upon draft hitches by the general simplification of said structures in minimizing the number of parts and making the same practical and efficient yet readily attachable between a tractor and trailer or the like, the device having provision for the extensibility and retractability thereof and the same having readily releasable means for holding it in its extended and retracted condition.

Other objects and advantages will hereinafter appear in the following description.

A non-limiting but practical adaptation and exemplification of the invention is illustrated in the accompanying drawing, in which Figure 1 is a top plan view of the device in retracted condition;

Figure 2 is a longitudinal section on the line 2—2 of Figure 1; and

Figure 3 is a longitudinal section on the line 3—3 of Figure 2.

Referring now to the drawing in detail, the numeral 5 designates, generally, the entire hitch device. As shown, the hitch comprises an outer elongated tubular member 6 and an inner tubular member 7 fitted to slide longitudinally in said outer member 6. The outer member 6 is provided at its outer end with a conventional clevis 8 for its attachment to a trailer or the like. The inner member 7 is provided at its outer end with a clevis 9, in opposed relation to the clevis 8 on the outer member 6, for the attachment of the inner member 7 to a tractor or the like.

The inner tubular member 7 is provided at its opposite sides with a parallel pair of longitudinal slots 10 and 11 extending throughout the major part of its length, that is to say, said slots 10 and 11 terminating in proximity to the opposite ends of said member 7. A transverse bolt 12, located adjacent the inner end of said outer tubular member 6, is mounted in apertures provided therefor at opposite sides of said member 6, said bolt extending through the slots 10 and 11 of said inner member 7 and transversely of said member 7. The bolt 12 may be riveted fixedly in said outer tubular member 6 but as shown the bolt is provided with a fixed head at one end and its opposite end portion is screw threaded for the reception of a retaining nut 12' whereby the bolt may be removed and replaced at will and as may be necessary.

The length of the slots 10 and 11 and the relative arrangement of the bolt 12 is such that the inner tubular member 7 can be moved to a position where it is contained with substantially its entire length within said outer tubular member 6 and by the same token the inner member 7 can be moved to an extended position where it is, throughout nearly its entire length, outside of said outer tubular member 6, said bolt 12 affording a substantial stop engageable by the inner and outer ends of said slots 10 and 11 in the inner member 7 whereby the latter is arrested and held in its innermost and outermost positions in said outer member 6.

Sleeved rigidly on the outer end portion of said inner tube 7, so as to abut against the adjacent inner end of said outer tube 6 in the closed positions of the tubes as shown in the drawing, is a sleeve 13. This sleeve 13 may be fastened to the tube 7 in any approved or conventional manner, such as by shrinking or welding the same on the tube. However, by way of illustration, the sleeve 13 is shown in Figure 2 as riveted to the tube 7, as at 14. Obviously, the sleeve 13 may be fastened to the tube 7 in any other manner as far as the present invention is concerned.

One function of the sleeve 13 is to reinforce and strengthen the outer end portion of said inner tube 7 and it also serves as a substantial abutment to engage the outer end of said outer tube 6 when the inner tube is moved into its innermost position in said tube 6. In this connection, it is here noted that the clevis 9 on the end of the inner tube 7 is formed by cutting opposite side walls of the tube away and providing the two remaining wall portions with transversely opposed apertures for the reception of the detachable bolt 9' by which the clevis 9 is detachably connected to the hitch element of the tractor (not shown).

A spindle element 15, having a suitable handle portion at one end for its manipulation, is hingedly mounted in transversely aligned apertures provided therefor in opposite sides of the inner tube 7 and its reinforcing sleeve 13. The handle portion 16 may be in any form and arrangement but, as shown, it comprises a substantially elongated looped integral portion of the spindle 15 extending transversely across the upper end of the same.

An elongated latch element 17, located within said inner tubular member 7, has a transverse bore therethrough, through which bore the spindle 15 is passed and said latch member 17 is fixedly secured to the spindle 15 by a transverse pin 18. To facilitate the application of the pin 18 to said latch member 17 and spindle 15, and for its ready removal when desired, aligned apertures 19 are provided in adjacent opposite side portions of said outer and inner tubes 6 and 7 (see Figure 3) for the insertion and application of a suitable tool. The inner end portion of said latch member 17 is provided with a hooked lug 20 arranged and adapted to engage said bolt 12 that is carried by said outer tubular member 6. As shown, said hooked lug portion 20 of the latch member 17 is formed with a beveled face 21 so that, when the inner tubular member 7 is moved into its innermost position, as shown in Figure 3, said beveled portion 21 rides with cam effect at one side of said bolt 12 until the latch member is in position for its hooked shoulder to engage said bolt 12 and thus lock the inner tubular member 7 from outward movement in said outer tubular member 6.

To move the inner tubular member 7 outwardly in said outer tubular member 6, said latch element 17 is moved out of engagement with the bolt 12 by grasping the handle portion 16 of the spindle 15 and forcibly effecting rotation of the spindle so as to move the latch member out of engagement with said bolt 12, whereupon the inner tubular member 7 is readily withdrawable in an outward direction with respect to said outer tubular member 6.

Any suitable means may be provided for holding said latch element in its bolt-engaging position. As shown, the latch member 17 is provided with a rigid leaf extension projecting from its axis in a direction opposite to that of its hooked end portion, as at 22, said extension 22 having a lateral stop pin 23 to abut the adjacent side wall of said inner tube 7 in the normal bolt-engaging position of said latch member 17, and there being provided on the opposite side of said extension 22 a similar pin 24 which supports a helical spring 25 that is normally maintained under tension between said extension 22 and the opposite side wall of said inner tube 7. By this provision, the spring 25 yields to permit rocking movement of said latch member 17 out engagement with said bolt 12 by manual manipulation of said handle member 16 on the spindle 15. Said spring 25 also reacts to restore said latch member to its normal position after each operation thereof.

From the foregoing it is seen that there is produced a simple and effective draft hitch device, of a telescopic character, which is readily extensible for the attachment of a trailer to a tractor and under conditions where the trailer is located at different distances from the tractor, and by which provision, after the connections have been effected between the clevises 8 and 9 and the hitching devices of the tractor and trailer, all that is necessary to complete the hitch is for the operator to back the tractor, by which operation the inner tubular member 7 is moved inwardly in the outer tubular member 6 until the end of the sleeve 13 on the inner member abuts against the adjacent end of the outer tubular member, at which time the hooked end portion 20 of the latch member 17 has engaged the bolt 12. In this connection, it is here noted that to secure a free and easy movement of the latch member 17 into and out of engagement with the bolt 12 that is carried by the other tubular member 6, said sleeve 13 is proportioned in length and accordingly positioned on the outer end portion of the inner tubular member 7 so that at the time the inner end of the sleeve 13 is in direct abutting engagement with the adjacent end of the outer tubular member 6, there is a slight space between the shoulder afforded by the hooked end portion 20 of said latch member 17 and the bolt 12. By the same token, when pull is exerted on the inner tubular member 7 to bring the shouldered portion 20 of said latch member 17 into contact with said bolt 12, there is a corresponding space between the inner end of said sleeve 13 and the adjacent end of said outer tubular member 6 (see Figures 2 and 3) said space being designated by the numeral 26 and the size of the space being somewhat exaggerated for clarity in illustration thereof, it being understood that this space being only necessary to give the aforesaid free and easy movement to said latch member 17 in its automatic locking engagement with bolt 12 when the inner tubular member 7 is moved into its innermost position in said outer tube 6.

With the foregoing description it is only necessary to here further state that, obviously, the spindle member 15 and bolt 12, together with the latch element 17, must be of sufficient strength to resist the pull on the outer and inner tubes 6 and 7 in the use of the hitch device. The same is true as to the pin or bolt member 8' of the clevis 8 and the corresponding bolt member 9' of the clevis 9.

The herein illustrated exemplification of the invention is but one embodiment thereof. Therefore, the structure admits of considerable modification within the spirit and scope of the appended claims and the invention is not limited to the specific construction and arrangement shown.

Having thus described the invention, what is claimed is:

1. A draft hitch comprising an elongated outer tubular member and an elongated inner tubular member fitted slidably in said outer member, said members being provided at their opposite outer ends with means for detachable connection respectively to a tractor and a trailer or the like, said inner tubular member being arranged and adapted for its substantially complete content within the outer member in the closed condition of the hitch and withdrawable also to nearly its full length outside of said outer member, said inner member having parallel longitudinal slots in its opposite side wall portions, said slots extending at opposite ends into proximity to the opposite ends of the inner member, a transverse bolt carried by said outer member and extended transversely across the inner end portion of said member and through the slots in said inner member, the outer ends of the longitudinal slots in said inner member, in the retracted position of said inner member within said outer tubular member, being closely contiguous to said transverse bolt on said outer member, but, in the outermost extended position of said inner tubular member, the inner ends of its longitudinal slots being brought against said transverse bolt of the outer member whereby to prevent detachment of said inner tubular member from said outer member, a latch element located within the outer end portion of said inner tubular member and extended supportedly inwardly from a transverse spindle element which is extended across and mounted rotatably in the opposite side wall portions of said inner tubular member, said latch member having a hooked end portion to releasably engage and hold against said transverse bolt of said outer tubular member, and operating means on said spindle element outside of said inner tubular member for manual rotation of said spindle member to release its carried latch element from said transverse bolt on said outer tubular member.

2. An extensible and retractible draft hitch in the construction and arrangement of parts as set forth in claim 1, wherein the latch element is normally spring-urged and yieldably held in a normal position in the inner tubular member to engage the transverse bolt on said outer tubular member and the manually operable means for rotating the spindle element as comprising a transversely disposed elongated looped integral portion of said spindle element.

3. A draft hitch of the character described, comprising an outer elongated tubular member and an inner elongated tubular member fitted and adapted to slide longitudinally in said outer member, said outer and inner members having at their opposite outer ends means for detachably connecting them respectively to a tractor and a trailer or the like, means comprising a bolt element fixedly secured at its opposite ends to the inner end portion of said outer tubular member and extending transversely of said member and through longitudinally slotted portions of said inner tubular member, said means, in the extended position of said inner tubular member, being arranged and adapted to arrest said member and hold the same against entire removal from said outer tubular member, a latch element within the outer end portion of said inner tubular member, said latch element being hingedly mounted on said inner tubular member adjacent its outer end and extending inwardly from its hinged mounting and arranged and adapted to releasably engage said transverse holding means on said outer tubular member, and rotatable manipulating means located externally of the adjacent end portion of said inner tubular member and constituting a direct integral operating part of said latch element for swinging the latch element from its engagement with said transverse holding means on said outer tubular member, and spring means normally urging and yieldably holding said latch element in position to automatically engage the transverse holding means on said outer member in the closed position of said inner member.

HAROLD R. FORNEY.

REFERENCES CITED

The following references are of record in the file of this patent:

UNITED STATES PATENTS

| Number | Name | Date |
|---|---|---|
| 2,179,439 | Trow | Nov. 7, 1939 |
| 1,296,105 | Navratil | Mar. 4, 1919 |